Aug. 31, 1954     L. G. PAGE     2,687,858
AIRCRAFT CONTROL
Filed Aug. 6, 1952
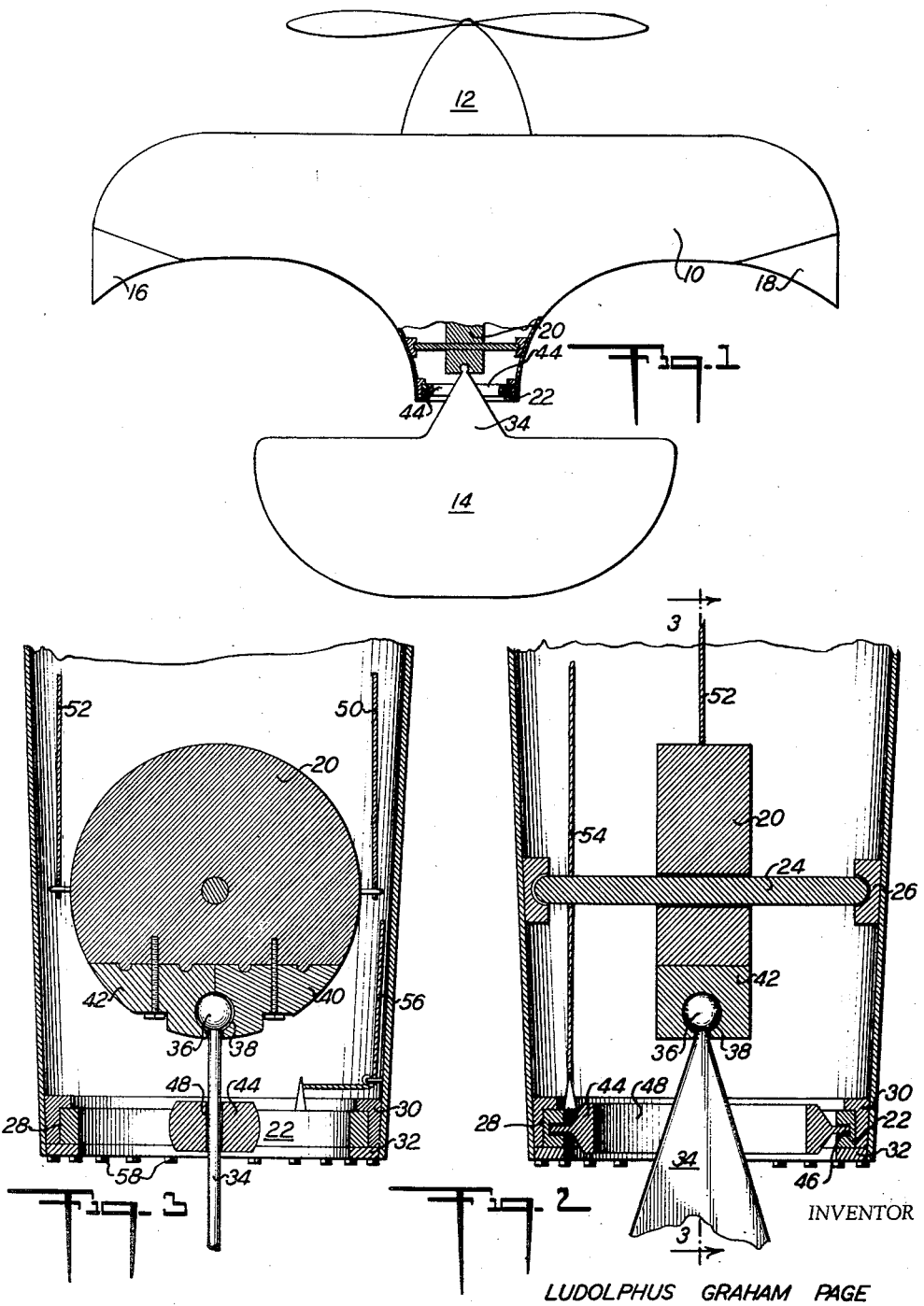
INVENTOR
LUDOLPHUS GRAHAM PAGE
BY
ATTORNEY Patented Aug. 31, 1954

2,687,858

UNITED STATES PATENT OFFICE 2,687,858

AIRCRAFT CONTROL

Ludolphus Graham Page, Yanceyville, N. C.

Application August 6, 1952, Serial No. 302,917

3 Claims. (Cl. 244—88)

The present invention relates to means for controlling aircraft in flight and, more specifically, to means for universally moving a single plane aircraft control member.

The present invention contemplates a small single-seat plane with flight controls similar to those of a bird and having a low landing speed as of about 15 miles per hour, and a relatively high cruising speed as of 100 miles per hour or more, with a very light but powerful motor. Flight with controls similar to that of a bird has long been in the minds of men and many such aeronautical devices have been tried with no commercial success. Important in the present invention, and foreign to conventional airplanes, is the concept of no substantial fuselage rearward of the trailing edge of the wings. Immediately behind the wings is a universally movable, single plane, control member hereinafter called a tail. This permits the body of the plane and the wings to be thrown in or out of the position of flaps by raising or lowering the tail just as a bird flying at full speed throws his body and wings directly against the wind and alights upon the object intended.

The advantages permitted by small bird-like aircraft built around an individual are numerous. Among the greatest of these is simplicity of control inasmuch as control problems are increased tremendously when space for more than one person is provided in the airplane. On the other hand, perhaps the largest number of advantages flow from the fact that such aircraft can be landed in a small space and yet fast flight features of conventional airplanes remain unimpaired.

A primary object of the present invention is the provision of a substantially flat aircraft control member or tail lying in a single plane which is easily moved to, and stabilized at, a plurality of vertical and tilted positions as predetermined by the pilot.

It is a further object of this invention to provide a small single seated airplane particularly adapted for landing on short air strips.

Other objects of the invention will become apparent from the specification and accompanying claims.

Generally the objects of the present invention are accomplished by the provision of a device for controlling flight of aircraft having a wing and a fuselage, wherein the device comprises a single, normally horizontal, flat, single-plane tail extending rearwardly from the fuselage and means within the fuselage for positioning the tail, said means comprising an arm extending from the tail into the fuselage, a first rotatable member in said fuselage cooperating with said arm for rotating it about an axis generally corresponding to a line extending along the length of the fuselage center, to control the tilt of the tail, and a second rotatable member in said fuselage cooperating with said arm for raising and lowering it to control the vertical position of said tail, one of said rotatable members being positioned at the rearmost portion of the fuselage and the other being slightly forward thereof.

More specifically, the objects of the present invention are attained by a device for controlling flight of aircraft having a wing and a fuselage, wherein the device comprises a single, normally horizontal, flat tail extending rearwardly from said fuselage and means within said fuselage for positioning the tail, said means comprising a rear rotatable member positioned at the rearmost portion of the fuselage with its axis of rotation generally along a line through the center of the length of the fuselage, a forward rotatable member positioned to rotate about a horizontal axis generally at right angles to the axis of said rear rotatable member, a universal socket positioned at the periphery of said forward rotatable member, a non-cylindrical aperture positioned adjacent the axis of rotation of said rear rotatable member, a mating non-cylindrical connecting arm rigidly fixed on said tail at one end, extending through said aperture in mated relationship and terminating at the other end in a ball positioned in said socket for universal movement therein, means for rotating said forward rotatable member for controlling the vertical positioning of said tail and means for rotating said rear rotatable member for controlling the tilt of said tail.

Even more specifically, the objects of the present invention are accomplished by a device for controlling flight of aircraft having a wing and a fuselage which does not extend substantially rearwardly of the wing's trailing edge; the device comprising a single, normally horizontal, flat tail extending rearwardly from said fuselage and means within said fuselage for positioning said tail, said means comprising a rotatable ring positioned at the rearmost portion of the fuselage with its axis of rotation generally along a line extending through the length of the fuselage center, a forward rotatable cylinder positioned adjacent said ring, the axis of rotation of said cylinder being horizontal and at right angles to the rotational axis of said ring, a universal socket mounted at a rear portion of the periphery of said cylinder, a normally horizontal cross-member pivotally mounted to extend across the inside diameter of said ring, a non-cylindrical aperture positioned at the center of said cross-member, a non-cylindrical arm fixed on said tail at one end, extending through and mating with said aperture and terminating at the other end in a ball fixed in said socket for universal movement therein, means for rotating said cylinder for controlling the vertical positioning of said tail and means for rotating said ring for controlling the tilt of said plane member.

One construction according to the invention as applied to a monoplane is illustrated somewhat diagrammatically by way of example in the accompanying drawings, in which:

Figure 1 is a plan view of one form of airplane according to the invention with a part of the fuselage broken away to reveal key elements of the invention.

Figure 2 is a more detailed plan view of the rotatable members shown generally in Figure 1.

Figure 3 is a cross section along line 3—3 of Figure 2.

In the construction illustrated, the airplane comprises a single wing 10, a fuselage 12, and a normally horizontal, fan shaped, generally flat, single-plane tail 14. The wing 10 is equipped with ailerons 16 and 18 which aid in maneuvering the airplane and may be synchronized with the tail 14 by any conventional means known in the art. The swept back wing is desirable in combination with the present invention but that, per se, forms no part thereof. The fuselage 12 is of generally conventional construction forward of the wing but extends barely rearward of the trailing edges of the wing.

A pair of rotatable members 20 and 22 are positioned adjacent one another in the rearward portion of the fuselage for controlling the positioning of tail 14. The more forward member 20 is in the form of a cylinder and is positioned to rotate with an axle 24 journaled in suitable bearings illustrated diagrammatically at 26 along the inside walls of fuselage 12. It is within the scope of the present invention to have the cylinder 20 rotate about the axle rather than with it. The axle 24 and cylinder 20 rotate about a horizontal axis at right angles to an imaginary line extending through the center length of the fuselage.

The other rotatable member, ring 22 is held at its outer periphery by a receiving groove indicated generally at 28 and made up of a receiving rim 30 and a retaining rim 32. Ring 22 is positioned at the rearmost portion of the fuselage and retaining rim 32 actually serves to seal the rear of the fuselage.

An arm 34 of about the same thickness as flat tail 14 but of much less width extends forward from the tail into the rear of the fuselage 12. It extends through rotatable ring 22 forward to rotatable cylinder 20, and it narrows from rear to front to where it terminates in a ball 36. A socket 38 is provided in the periphery of rotatable cylinder 20 for receiving and holding ball 36. Socket 38 is made from split members 40 and 42 positively positioned by dowels and bolts.

Ring 22 is provided with a normally horizontal cross-member 44 pivoted in suitable bearings illustrated generally at 46. Bearings 46 are fixed on ring 22 so that cross-member 44 rotates therewith. A slot 48 extends through cross-member 44 and slidably receives arm 34.

Rotation of cylinder 20 is accomplished by control wires 50 and 52 which are actuated by any conventional means (not shown) manually operated by the pilot. Rotation of ring 22 is accomplished by control wires 54 and 56 also actuated by any conventional manual means (not shown).

Replacement of parts in the present invention is facilitated by the above-described removable socket 38 and removable retaining rim 32, held in an easily accessible position by bolts 58.

The nature of rotatable cylinder 20 may be varied from a cylindrical member to other forms as, for example, to a three spoke arrangement on a hub wherein one spoke would serve as attachment for control wires 50, another for control wire 52, and the third as a mounting for socket 38. Similarly, rotatable member 22 may be altered from a ring and pivoted cross-member to a slotted disk with enough clearance to permit arm 34 to be slidably mounted through the slot. The shape of arm 34 can be varied in any manner so long as it is not made completely cylindrical. Of course any change in the shape of arm 34 must be accompanied by a similar change in the shape of cross-member 44 and the slot 48 so that rotation of member 22 causes rotation of tail 14. It is desirable in some forms of this invention to provide brakes for rotatable members 20 and 22 so that they may be absolutely stabilized at predetermined positions during level flight. Other modifications will be obvious to one skilled in the art from reference to this specification.

Operation

To operate the control means of the present invention, one may simultaneously or independently rotate members 20 and 22 by means of the appropriate control wires. Forward pull on control wire 50 rotates cylinder 20 forward, thereby raising socket 38 and ball 36 at the end of arm 34. Pivoted cross-member 44 fulcrums arm 34 to depress tail 14. Slidable mounting of arm 34 in slot 48 permits ease of operation as the distance between the ball 36 and cross-member 44 changes. Reverse rotation of cylinder 20 by forward pull of control wire 52 raises tail 14 by the same mechanism.

By forward pull on control wire 56, ring 22 may be rotated to the airplane's right, thereby tilting cross-member 44, arm 34, and tail 14 to the right. The round head of ball 36 permits the tilt to be effected without regard to the vertical position of the tail. Forward pull on control wire 54 will tilt tail 14 to the plane's left in a like manner.

Thus it will be seen that the tail 14 may be positioned universally with respect to the rear of the fuselage by the combination of a pair of rotatable members manually actuated by the pilot. It will be further seen that the construction described has particular advantages because of the two point action on the arm 34. While the arm is short, it is held at two points to give it a high degree of stability, regardless of prevailing air currents. It will also be noted that the wide rear portion of arm 34 gives good leverage for ease of movement by cross-member 44 and ring 22.

Having thus described my invention, I claim:

1. A device for controlling flight of aircraft having a wing and a fuselage comprising a single, normally horizontal, substantially flat tail extending rearwardly from said fuselage and means within said fuselage for positioning said tail, said means comprising a rear rotatable member positioned at the rearmost portion of the fuselage with its axis of rotation generally along a line through the center of the length of the fuselage, a forward rotatable member positioned to rotate about a horizontal axis generally at right angles to the axis of said rear rotatable member, a universal socket positioned at the periphery of said forward rotatable member, a non-cylindrical aperture positioned adjacent the axis of rotation of said rear rotatable member, a mating non-cylindrical connecting arm rigidly fixed on said tail at one end, extending through said aperture in mated relationship and terminating at the other end in a ball positioned in said socket, for universal movement therein, means for rotating said forward rotatable member for controlling the vertical positioning of said tail and means for rotating said rear rotatable member for controlling the tilt of said tail.

2. A device for controlling flight of aircraft having a wing and a fuselage comprising a single, normally horizontal, substantially flat tail extending rearwardly from said fuselage and means within said fuselage for positioning said tail, said means comprising a rear rotatable member positioned at the rearmost portion of the fuselage with its axis of rotation generally along a line through the center of the length of the fuselage, a forward rotatable member positioned to rotate about a horizontal axis generally at right angles to the axis of said rear rotatable member, a universal socket positioned at the periphery of said forward member, a normally horizontal slot positioned adjacent the axis of rotation of said rear rotatable member, a generally flat connecting arm rigidly fixed on said tail at one end, extending through said slot and terminating at the other end in a ball positioned in said socket, means for rotating said forward rotatable member for controlling the vertical positioning of said tail and means for rotating said rear rotatable member for controlling the tilt of said tail.

3. A device for controlling flight of aircraft having a wing and a fuselage comprising a single, normally hormally horizontal, substantially flat tail extending rearwardly from said fuselage and means within said fuselage for positioning said tail, said means comprising a rotatable ring positioned at the rearmost portion of the fuselage with its axis of rotation generally along a line extending through the length of the fuselage center, a forward rotatable cylinder positioned adjacent said ring, the axis of rotation of said cylinder being horizontal and at right angles to the rotational axis of said ring, a universal socket mounted on the rear portion of the periphery of said cylinder, a normally horizontal cross-member pivotally mounted to extend across the inside diameter of said ring, a non-cylindrical aperture positioned at the center of said cross-member, a non-cylindrical arm fixed on said tail at one end, extending through and mating with said aperture and terminating at the other end in a ball fixed in said socket for universal movement therein, means for rotating said forward rotatable member for controlling the vertical positioning of said tail and means for rotating said rear rotatable member for controlling the tilt of said tail.

References Cited in the file of this patent

UNITED STATES PATENTS

| Number | Name | Date |
| --- | --- | --- |
| 868,039 | De Uherkocz | Oct. 15, 1907 |
| 1,118,124 | Gustiana | Nov. 24, 1914 |
| 1,378,895 | Pearson | May 24, 1921 |
| 1,396,459 | Ortgier | Nov. 8, 1921 |
| 1,591,315 | Hunter | July 6, 1926 |
| 1,622,208 | Roberts | Mar. 22, 1927 |
| 1,721,598 | Karrasch | July 23, 1929 |
| 2,621,871 | Robert | Dec. 16, 1952 |